(No Model.)
J. H. MITCHELL.
STRIPPING DEVICE FOR CRACKER AND CAKE MACHINES.
No. 441,890. Patented Dec. 2, 1890.
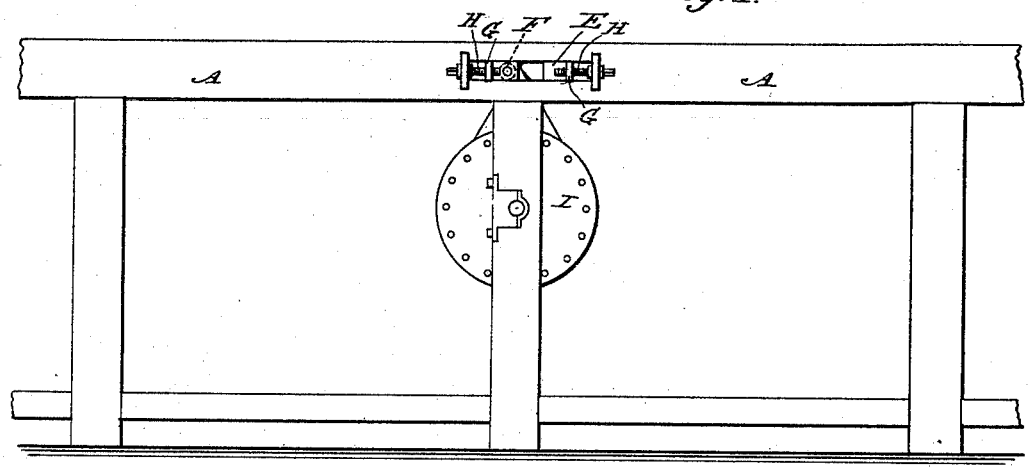
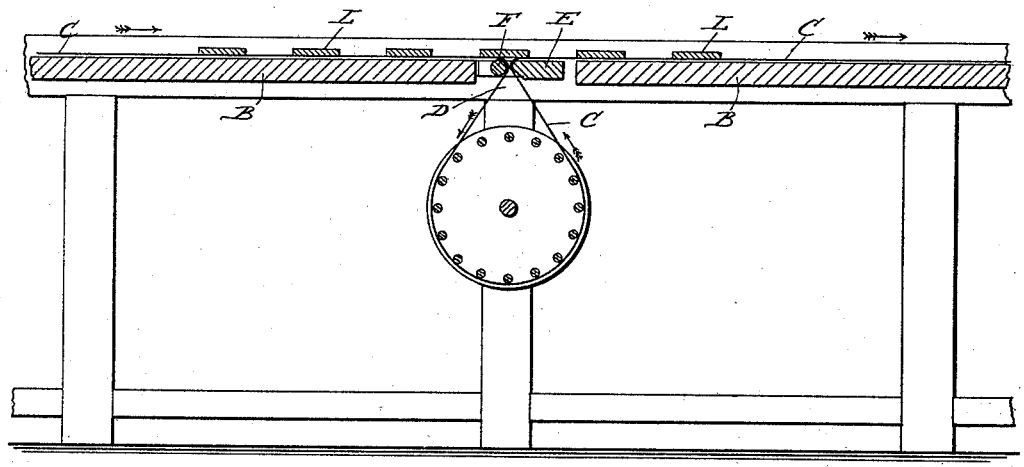
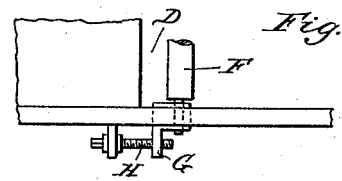
WITNESSES:
D. C. Reusch
Gertrude Ward
INVENTOR
J. H. Mitchell,
BY A. M. Pierce.
ATTORNEY

UNITED STATES PATENT OFFICE.

JAMES HENRY MITCHELL, OF PHILADELPHIA, PENNSYLVANIA.

STRIPPING DEVICE FOR CRACKER AND CAKE MACHINES.

SPECIFICATION forming part of Letters Patent No. 441,890, dated December 2, 1890.

Application filed August 4, 1890. Serial No. 360,918. (No model.)

*To all whom it may concern:*

Be it known that I, JAMES HENRY MITCHELL, a citizen of the United States, residing at Philadelphia, in the county of Philadelphia and State of Pennsylvania, have invented new and useful Improvements in Stripping Devices for Cracker and Cake Machines, of which the following is a specification.

My invention relates especially to mechanism for stripping cakes, crackers, and other plastic products from the belt or band of a machine whereon they are stamped or formed, and has for its object the provision of a cheap and simple device, whereby said product may be disengaged from contact with or adhesion to the carrying belt or band of a cracker or cake machine, in order that such product may be easily removed for baking, &c., and the shape given the cracker or cake while in the dough or plastic state will not be injured or destroyed.

To attain the desired end my invention consists, essentially, in an attachment to cracker and cake machines whereby the belt or band whereon the products are stamped is caused to leave its horizontal movement while the machine is in operation and then return thereto, the cakes or crackers continuing a horizontal forward movement across the break in the carrying-belt, whereby they are stripped from the places where they are originally formed or deposited and adhesion to the carrying-belt is prevented; and my invention also involves certain other novel and useful combinations or arrangements of parts and peculiarities of construction and operation, all of which will be hereinafter first fully described, and then pointed out in the claim.

In the drawings, Figure 1 is a side view of a portion of the bed of a cake or cracker machine wherewith my stripping device is employed. Fig. 2 is a longitudinal vertical sectional view of Fig. 1. Fig. 3 is a plan view showing a method of tightening the carrying-belt and bringing the edges of the break therein to a proper position.

Like letters of reference, wherever they occur, indicate corresponding parts in all the figures.

A is the main frame of the machine, and B the table or support for the carrying-belt C. The table is broken away at D, and is provided with a movable slide E and roller F, made adjustable by means of sliding bearings G, which engage with screws H. The belt C passes over the adjustable portions of the table around a drum I beneath the table, as particularly indicated in Figs. 1 and 2. This drum is preferably made very light, adding very little to the power required to drive the machine. The adjustable roller and slide should be brought closely enough together to permit the downgoing and upgoing portions of the belt to just touch each other with little friction.

I have shown a roller and a simple sliding bar, but do not confine myself to either or both of these constructions, for any simple and effective means of holding the parts in a proper position may be employed.

When constructed and arranged in accordance with the foregoing description, the operation of my device is as follows: Motion being imparted to the carrying-belt, the direction of movement will be as indicated by the arrows. When cakes or crackers L are formed or deposited upon the belt, they adhere thereto in such a manner as at times to render it difficult to remove them, whereby the form of the cake is changed or destroyed. By my device, as the cakes move with the carrying-belt, they pass over the break in the supporting-table and continue to move along thereon; but the belt, instead of continuing its horizontal movement, leaves the cake, passes around the drum, and then back to the table. This strips the cake free from adhesion to the belt without in any way injuring its form, and when the point of removal is reached the perfect cakes may be readily lifted in the usual manner.

Having now fully described my invention, what I claim as new therein, and desire to secure by Letters Patent, is—

A stripping device for cracker and cake machines, in which is comprised a movable carrying-belt, supports for the carrying-belt, a drum beneath said supports and around which the carrying-belt passes, and means for holding the downwardly and upwardly moving portions of the belt in close proximity to each other near the horizontal line of movement of the belt, substantially as shown and described.

JAMES HENRY MITCHELL.

Witnesses:
 JAMES LECKIE,
 CHAS. H. MILLER.